US009421865B2

(12) United States Patent
Bernardi et al.

(10) Patent No.: US 9,421,865 B2
(45) Date of Patent: Aug. 23, 2016

(54) MOTOR VEHICLE PROVIDED WITH A POWERTRAIN UNIT AND A SAFETY DEVICE FOR MOVING THE POWERTRAIN UNIT SIDEWAYS DURING AN IMPACT

(71) Applicant: FCA Italy S.p.A., Turin (IT)

(72) Inventors: Alessandro Bernardi, Turin (IT); Cristian Trocino, Turin (IT); Daniele Ghislieri, Turin (IT); Gianfranco Del Nero, Turin (IT); Sergio Bianco, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 14/677,221

(22) Filed: Apr. 2, 2015

(65) Prior Publication Data

US 2015/0283901 A1    Oct. 8, 2015

(30) Foreign Application Priority Data

Apr. 4, 2014    (IT) .............................. TO2014A0283

(51) Int. Cl.
| | | |
|---|---|---|
| B60K 28/14 | (2006.01) | |
| B60K 5/12 | (2006.01) | |
| B62D 21/15 | (2006.01) | |
| B62D 25/08 | (2006.01) | |

(52) U.S. Cl.
CPC ............. *B60K 28/14* (2013.01); *B60K 5/1275* (2013.01); *B62D 21/152* (2013.01); *B62D 25/082* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,174,009 B1* | 1/2001 | McKeon | ................ | B60R 19/34 188/377 |
| 6,554,333 B2* | 4/2003 | Shimotsu | ............... | F16F 7/125 293/132 |
| 6,957,846 B2* | 10/2005 | Saeki | .................. | B62D 21/152 180/232 |
| 7,931,318 B2* | 4/2011 | Matsumura | ............ | B60R 19/24 293/133 |
| 8,333,425 B2* | 12/2012 | Yoshida | ............... | B62D 21/152 296/187.09 |
| 8,807,632 B2* | 8/2014 | Ramoutar | .............. | B60R 19/24 293/132 |
| 8,833,838 B2* | 9/2014 | Watanabe | ........... | B62D 25/082 296/187.09 |
| 9,061,713 B2* | 6/2015 | Hashimoto | .......... | B62D 21/152 |
| 9,180,915 B2* | 11/2015 | Kim | .................... | B62D 25/082 |

(Continued)

FOREIGN PATENT DOCUMENTS

| | | | | |
|---|---|---|---|---|
| DE | 102012014449 A1 * | 1/2014 | .......... | B62D 21/152 |
| DE | 102013018078 A1 * | 5/2015 | .......... | B62D 21/152 |

(Continued)

OTHER PUBLICATIONS

Italian Search Report for Italian Patent Application No. IT TO2014A000283 dated Nov. 21, 2014.

*Primary Examiner* — Nicole Verley
(74) *Attorney, Agent, or Firm* — McCarter & English, LLP

(57) ABSTRACT

A motor vehicle has an engine compartment accommodating a powertrain and at least one strut, which is substantially parallel to an advancing longitudinal axis of the motor vehicle; the motor vehicle has a safety device configured so as to move the powertrain sideways during an impact, towards the side opposite to the one concerned by the impact; the safety device is provided with a beam having a first end, distanced from an end portion of the strut towards the outside of the engine compartment, and a second end fixed to the strut in a position which is horizontally beside the powertrain; the safety device is also provided with a restraining member fixed to the strut and having a protruding portion arranged behind a wall of the beam.

9 Claims, 4 Drawing Sheets

(56) References Cited

U.S. PATENT DOCUMENTS

| | | | |
|---|---|---|---|
| 9,187,053 B2 * | 11/2015 | Nusier | B60R 19/34 |
| 2014/0091595 A1 | 4/2014 | Ramoutar et al. | |
| 2015/0076862 A1 * | 3/2015 | Abe | B62D 21/152 |
| | | | 296/187.1 |
| 2015/0246651 A1 * | 9/2015 | Muraji | B62D 21/152 |
| | | | 296/187.1 |
| 2015/0298634 A1 * | 10/2015 | Hara | B60R 19/34 |
| | | | 293/133 |
| 2015/0329144 A1 * | 11/2015 | Hara | B62D 21/152 |
| | | | 296/187.09 |
| 2015/0336613 A1 * | 11/2015 | Friedrich | B62D 21/152 |
| | | | 701/45 |

FOREIGN PATENT DOCUMENTS

| | | |
|---|---|---|
| EP | 1612126 | 1/2006 |
| JP | S6297066 | 6/1987 |
| JP | 2009248603 | 10/2009 |

* cited by examiner

MOTOR VEHICLE PROVIDED WITH A POWERTRAIN UNIT AND A SAFETY DEVICE FOR MOVING THE POWERTRAIN UNIT SIDEWAYS DURING AN IMPACT

TECHNICAL FIELD

The present invention relates to a motor vehicle provided with a powertrain unit and with a safety device for moving the powertrain unit sideways during an impact.

BACKGROUND OF THE INVENTION

As known, motor vehicles have a front frame accommodated in the front engine compartment and designed so as to obtain an adequate degree of safety, in particular for the passengers in the passenger compartment, in the event of accidents with front impact.

In particular, the front frame is provided with at least two pairs of longitudinal struts, having collapsible zones to absorb energy due to impacts at relatively high speed. In the event of front impact against an obstacle arranged approximately at the centreline of the motor vehicle, the known solutions allow an excellent degree of safety to be obtained in the passenger compartment. Nevertheless, the results are not as satisfactory when the front impact occurs with an offset, that is with a deviation with respect to the longitudinal centreline axis, and concerns only a front edge of the motor vehicle. Regulations in particular provide safety tests with impacts where there is a so-called "small overlap" (for example equal to 25%) between the motor vehicle and the obstacle during the impact. In these cases, the stresses due to the impact are only unloaded onto one side of the motor vehicle and therefore, only onto certain longitudinal struts of the motor vehicle. Since the plastic deformation of the front frame is not able to absorb all the impact energy, the passenger compartment is also subject to deformations which instead should be avoided to ensure the safety of the passengers.

It is known from Patent Application DE102012013277A1, to provide a structure which, by moving during the impact, pushes the powertrain unit in transversal direction, towards the side opposite to the one which is concerned by the impact, so as to exploit the inertia of the powertrain unit to cause the motor vehicle to move away from the obstacle. This deviation in sideways direction of the whole motor vehicle is extremely advantageous for substantially keeping intact the part of body defining the passenger compartment.

The need is felt to improve the solutions shown diagrammatically in DE102012013277A1, so as to obtain an embodiment which can be applied to front frames of known type by means of a limited number of modifications and which, at the same time, is effective.

SUMMARY OF THE INVENTION

It is the object of the present invention to make a motor vehicle provided with a powertrain unit and with a safety device for moving the powertrain unit sideways during an impact, which allows the need disclosed above to be accomplished in a simple and cost-effective manner.

According to the present invention, a motor vehicle is made provided with a powertrain unit and with a safety device for moving the powertrain unit sideways during an impact. The disclosed motor vehicle may advantageously include: (i) a front engine compartment; (ii) a powertrain unit accommodated in the engine compartment; and (iii) at least one longitudinal strut accommodated in the engine compartment, substantially parallel to an advancing longitudinal axis of the motor vehicle and including (a) an end portion which is longitudinally distanced from a passenger compartment of the motor vehicle; and (b) an intermediate portion having a hole. The motor vehicle may further include a safety device coupled to the longitudinal strut and configured so as to move the powertrain unit sideways during an impact, towards the side opposite to the one concerned by said impact. The safety device may include a beam elongated along an axis and having a first axial end fixed with respect to the end portion and spaced sideways from the terminal portion towards the outside of the engine compartment, and a second axial end fixed by means of fixing means to the intermediate portion in a position which is horizontally beside the powertrain unit; and a restraining member that includes (a) an attachment portion fixed to the intermediate portion; and (b) a protruding portion, which protrudes with respect to the attachment portion so as to be arranged behind a wall of the beam.

Additional features, functions and benefits of the disclosed motor vehicle will be apparent from the detailed description, particularly when read in conjunction with the accompanying figures.

BRIEF DESCRIPTION OF THE DRAWINGS

To better understand the present invention, a preferred embodiment thereof is now described, by way of non-limiting example, with reference to the accompanying drawings, in which.

DETAILED DESCRIPTION OF THE INVENTION

Figure 1:
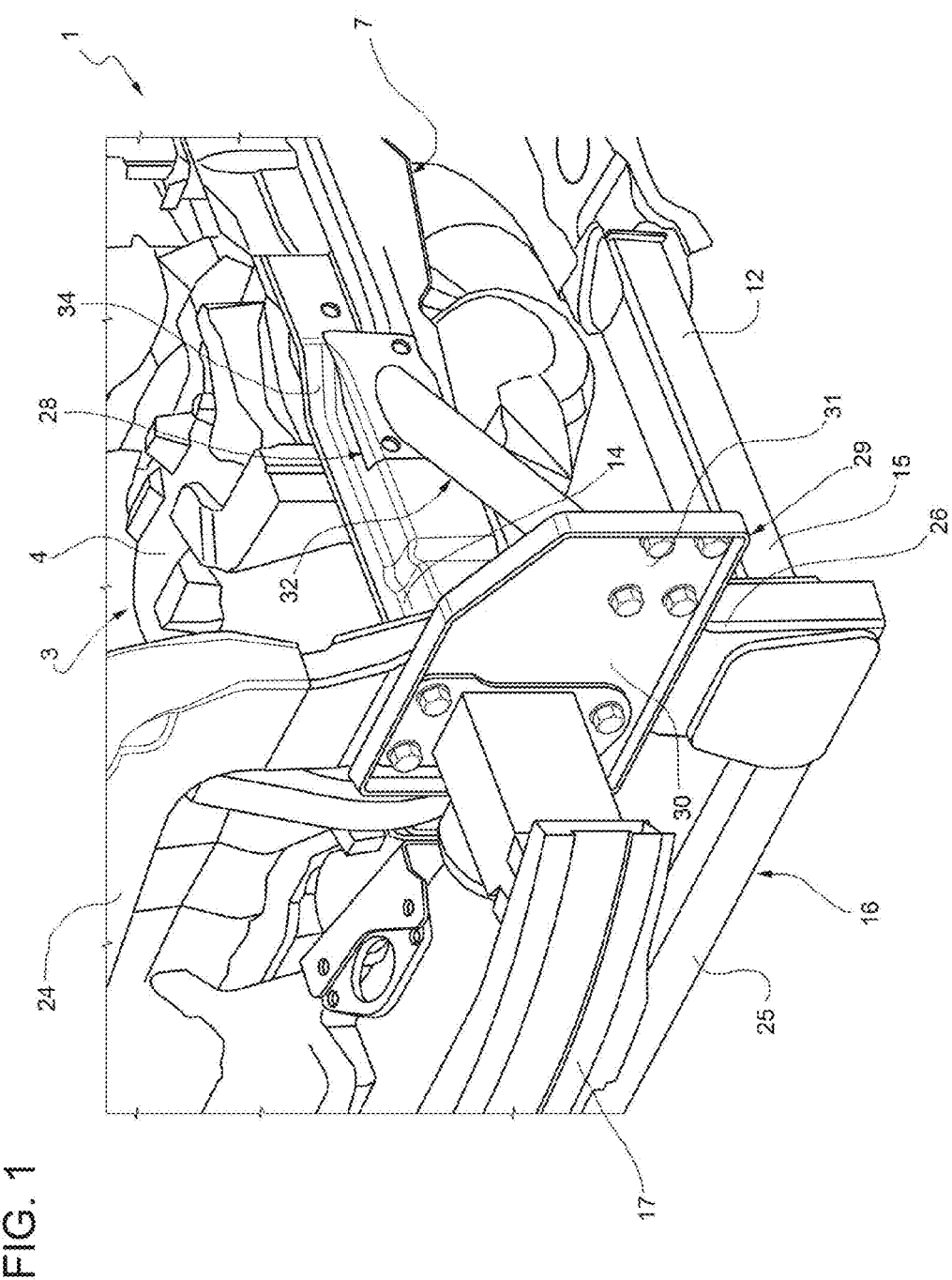
FIG. 1 is a perspective view, with parts removed for clarity, of a preferred embodiment of the motor vehicle provided with a powertrain unit and with a safety device for moving the powertrain unit sideways during an impact according to the present invention.

Numeral 1 in FIG. 1 indicates, as a whole, a motor vehicle (partly shown) having a passenger compartment 2 (FIG. 4) and an engine compartment 3, arranged in front of a lower zone of the passenger compartment 2.

The engine compartment 3 accommodates a powertrain unit 4 (defined by the ensemble of an engine and of a gear-box) and a front frame 5, comprising two front struts 7, only one of which is shown in FIG. 1. The struts 7 are substantially symmetrical to each other with respect to a vertical centreline plane, they are substantially parallel to the advancing longitudinal direction of the motor vehicle 1, and protrude forwards starting from a substantially vertical wall 8 (FIG. 4), which delimits a lower zone of the passenger compartment 2 at the front and is commonly called "fire-protection panel". Moreover, the struts 7 extend in positions which are horizontally beside the front wheelhouses of the motor vehicle 1.

Figure 4:
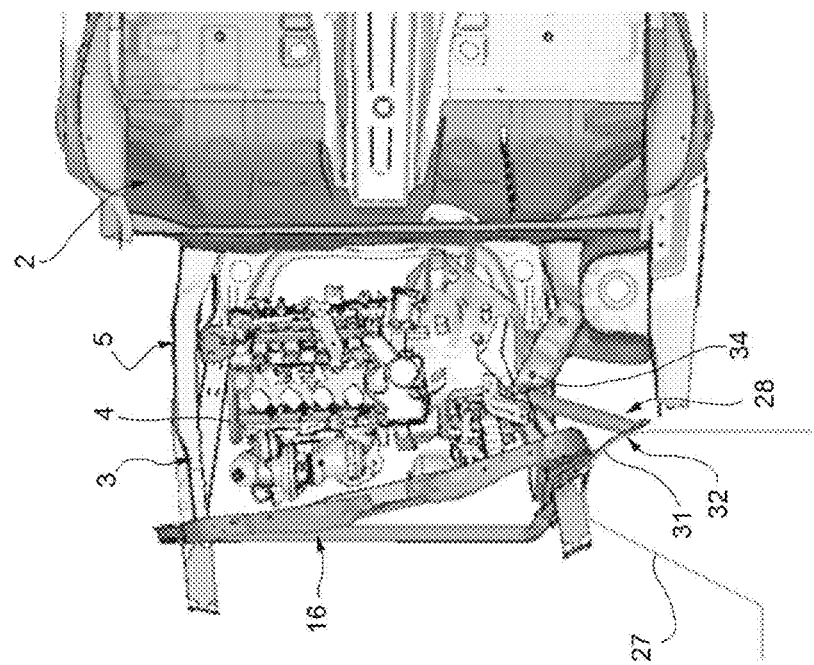
FIGS. 4 and 5 are top views showing, in simplified manner, the motor vehicle in FIG. 1 in two successive moments during an impact, with a small overlap between the motor vehicle and an obstacle which is schematically shown.

Preferably, the front frame 5 also comprises a pair of secondary struts 9 (only one of which is shown in FIG. 4), which are arranged above the wheelhouses and project forwards from the front uprights supporting the doors of the motor vehicle 1.

The front frame 5 also comprises two lower struts 12, which are arranged under the struts 7 and extend along respective substantially rectilinear axes, with an inclination from the bottom upwards in lateral view.

Again with reference to FIG. 1, the front ends of the struts 7, 12 are indicated by the numerals 14, 15, respectively, and are fixed to a substantially vertical annular structure 16 (partially shown). The annular structure 16 supports, in known manner and not described in detail, a heat exchanger assembly (not shown), surrounded by the annular structure 16, and a bumper, of which only the end of a support beam 17 is shown.

The annular structure 16 comprises an upper cross member 24, a lower cross member 25, and two lateral uprights 26, only one of which is shown in FIG. 1. The uprights 26 are normally called "vertical links", they are fixed directly or indirectly to the front ends 14, 15, and preferably are defined by plates, which are substantially vertical and are provided with holes for coupling to the front ends 14, 15 by means of screws or bolts.

Figure 5:
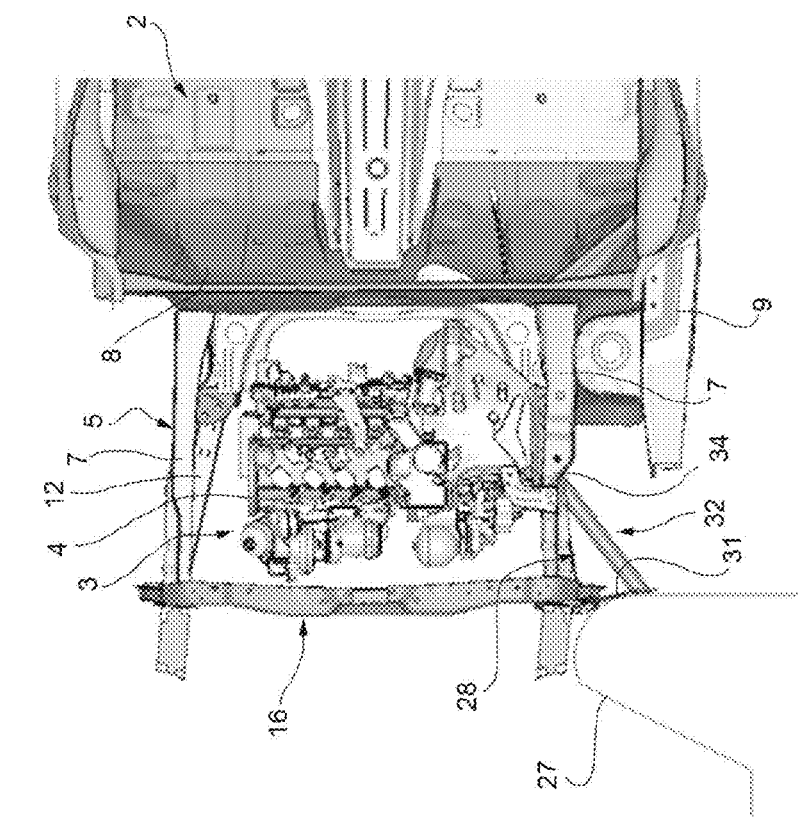

The front frame 5 also comprises a safety device 28 which intervenes when a front impact occurs with a small overlap (for example, equal to 25%) between the motor vehicle 1 and a substantially rigid obstacle 27 (schematically shown in FIGS. 4 and 5). For each side of the motor vehicle 1, the safety device 28 is defined by a structure which, during the impact, moves and pushes the powertrain unit 4 in transversal direction, towards the side opposite to the one which is concerned by the impact, so as to exploit the inertia of the powertrain unit 4 itself to cause the motor vehicle 1 to move away sideways from obstacle 27.

Structure 28 may be added, with slight modifications, to regular front frames of known motor vehicles currently marketed, and comprises a connection plate 29, which is substantially parallel to the upright 26. In particular, plate 29 comprises a portion 30, which is aligned longitudinally to strut 7, is fixed to upright 26 and/or to end 14, for example by means of screws or bolts, and preferably is resting on a front face of upright 26. Plate 29 also comprises a portion 31, which protrudes sideways from portion 30 and from upright 26 towards the outside of the engine compartment 3 and which is subjected to the impact against obstacle 27, as shown in FIGS. 4 and 5.

Figure 2:
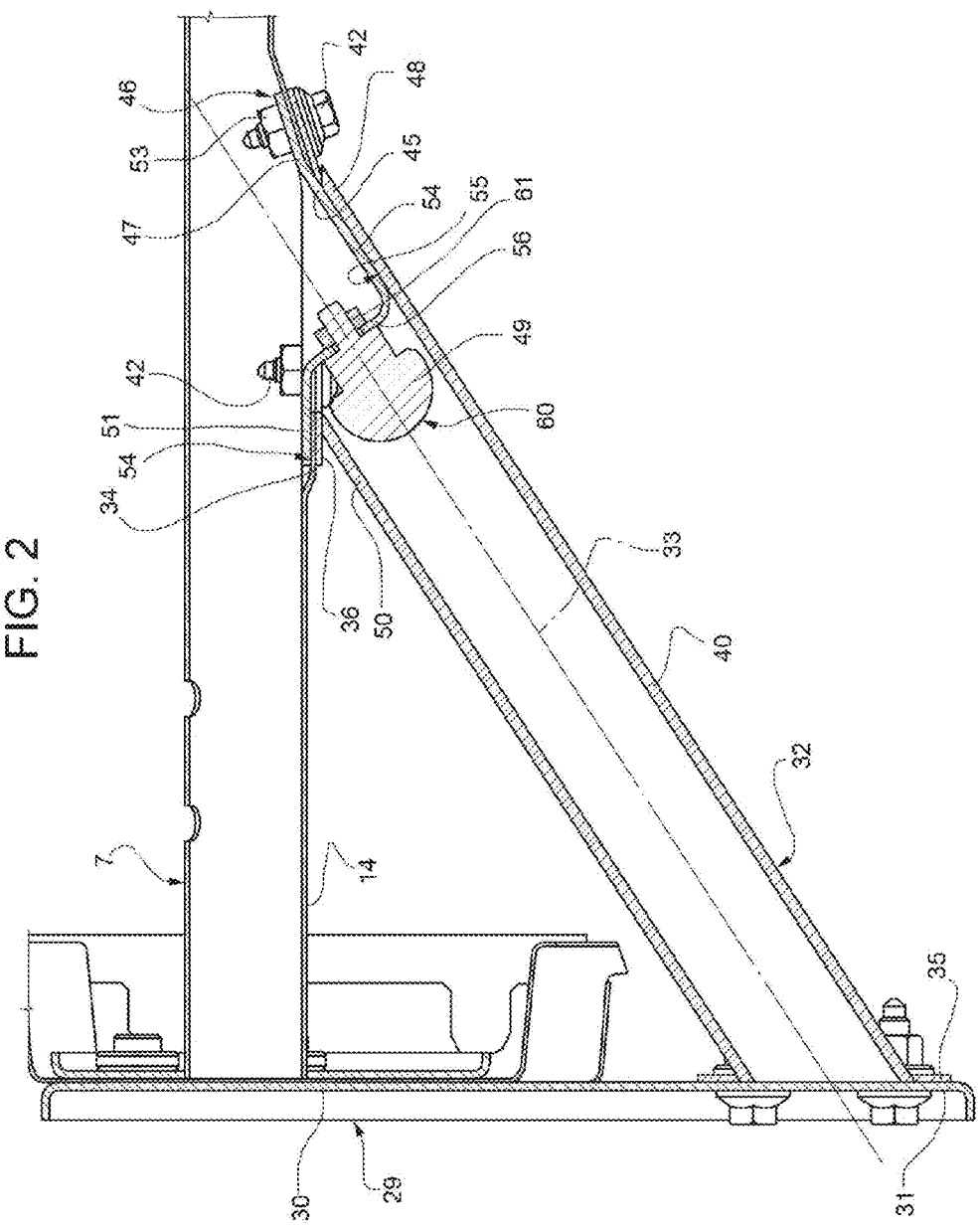
FIG. 2 shows a sectional view in enlarged scale, of the safety device of the motor vehicle in FIG. 1.
Figure 3:
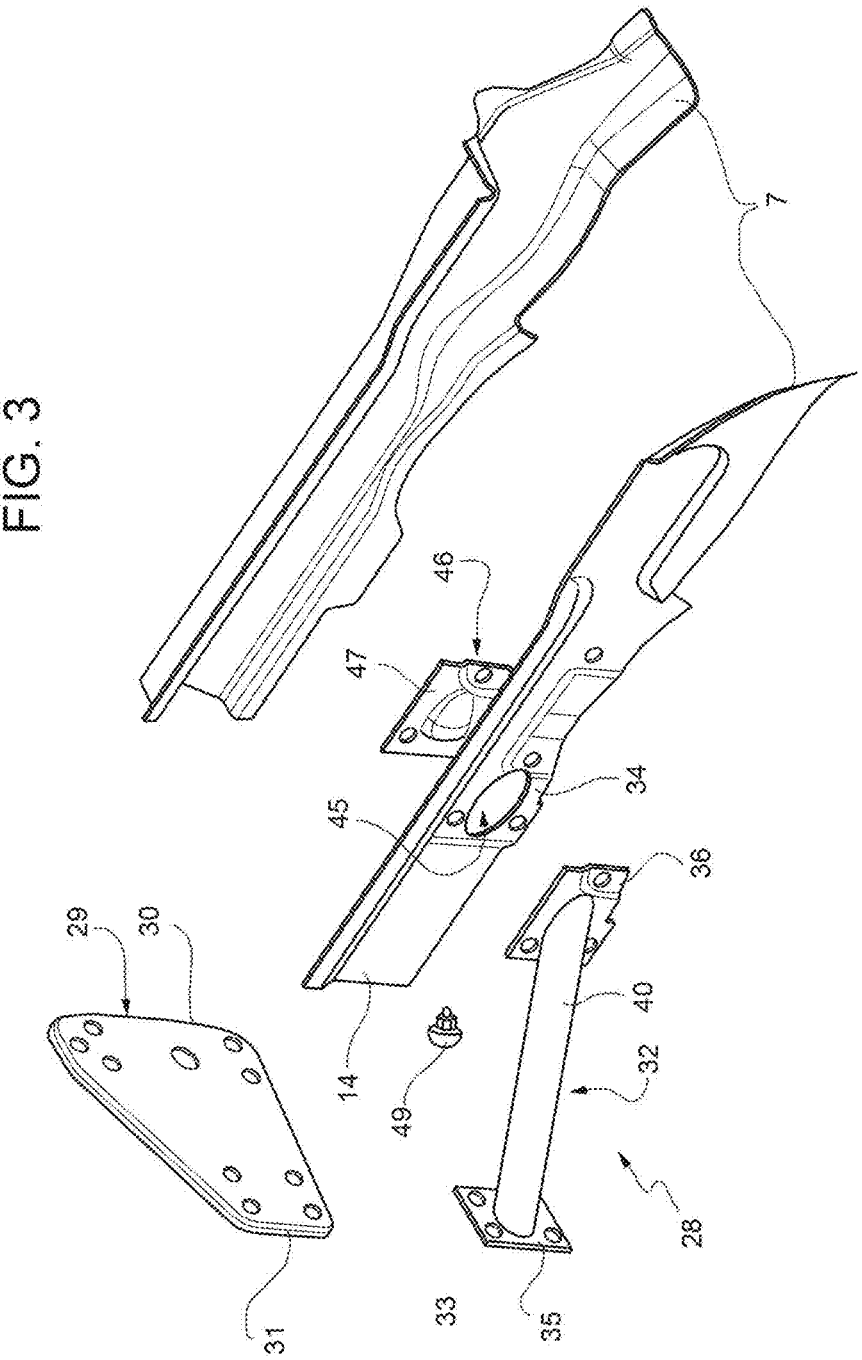
FIG. 3 is an exploded perspective top view of the safety device in FIG. 2.

With reference to FIG. 2, structure 28 also comprises a beam 32, arranged beside end 14 and extending along an axis 33 which intersects strut 7 at an intermediate portion 34 thereof, which is horizontally beside and relatively close to the powertrain unit 4 (FIGS. 1 and 4). Axis 33 is preferably rectilinear.

Beam 32 comprises an attachment end 35, which is fixed to portion 31, and therefore is spaced sideways from end 14 towards the outside; and an attachment end 36, which is opposite to end 35 and is fixed to the intermediate portion 34. Preferably, the ends 35, 36 are defined by respective flanges, which are fixed to the portions 31 and 34 by means of screws or bolts.

Beam 32 also comprises a tube 40 which extends from flange 35 to flange 36 and in particular, is welded to such flanges.

With reference to FIG. 2, the screws connecting flange 36 to the intermediate portion 34 are indicated by numeral 42 and are mainly subjected to a shear load, parallel to the longitudinal axis of strut 7, in the event of impact. To prevent such a shear load from causing the screws 42 to break and therefore the uncoupling of beam 32 from the intermediate portion 34, the latter has a hole 45 and, at the same time, structure 28 has a restraining member 46 comprising: an attachment portion 47 fixed directly or indirectly to the intermediate portion 34 and arranged on the side opposite to flange 36; an intermediate portion 48, which crosses hole 45; and an end portion 49 which protrudes from portion 48 along axis 33 so as to be arranged longitudinally behind a wall 50 of tube 40 (the meaning of the words "in front of" and "behind" is to be considered with reference to the advancing longitudinal direction of the motor vehicle 1).

Preferably, the attachment portion 47 consists of a flange 51 and of a plurality of nut screws 53 fixed to flange 51, for example by means of welding. Flange 51 is resting on a face 52 of the intermediate portion 34, inside strut 7, and preferably is fixed during assembly step to face 52 by welding. The screws 42 are screwed into the nut screws 53, they fix the flanges 36 and 51 to one another, and stably tighten the intermediate portion 34 between the flanges 51 and 36.

Preferably, portion 48 is defined by a shaped plate, of which flange 51 is an extension. In particular, the shaped plate 48 comprises a wall 54, which extends past hole 45 so as to engage tube 40 and is arranged in front of an inner surface 55 of tube 40. In particular, wall 54 has a semi-cylindrical shape, substantially complementary to the one of the inner surface 55, and is resting against the inner surface 55. The shaped plate 48 also comprises a wall 56, which is transverse to axis 33 and defines a base to which portion 49 is fixed.

Portion 49 consists of part of a body 60 which is separate from the shaped plate 48 and is fixed to wall 56, for example by means of a screw and nut screw coupling 61. In particular, portion 49 is defined by a semi-spherical head of body 60. Preferably, under non-deformed condition, portion 49 is distanced from wall 50 by a radial clearance, which is almost instantaneously cancelled when portion 31 frontally impacts obstacle 27.

As is apparent in FIG. 4, in response to such an impact, beam 32 is subject to a load which is directed in substantially longitudinal direction. Due to the configuration of the restraining member 46, portion 49 defines a shoulder for wall 50 of tube 40 and therefore transfers a part of the longitudinal load from tube 40 in transversal direction onto the intermediate portion 34 of strut 7, during the impact.

In particular, due to the semi-spherical shape of portion 49, wall 50 couples to the intermediate portion 34 so as to transfer the force to strut 7 both in longitudinal direction and in transversal direction also if the screws 42 are sheared due to the increased entity of the load to be transferred.

As shown in FIG. 5, the transversal load component transferred from the restraining member 46 to the intermediate portion 34 causes strut 7 to bend at the intermediate portion 34, which therefore moves towards the inside of the engine compartment 3, rests on the powertrain unit 4 and pushes it in transversal direction opposite to the side where the impact occurs.

This transversal push causes a sideways movement of the powertrain unit 4, which, with its own inertia, tends to move the motor vehicle 1 away from obstacle 27 in substantially automatic manner, thus deviating the trajectory with respect to the advancing direction that the motor vehicle 1 had before the impact.

It is apparent from that disclosed above that the safety device 28 is extremely effective, because the effects of the misaligned front impact on the centreline and with small overlap with respect to the barrier or obstacle 27 are reduced. In particular, the stresses from such an impact on the part of body defining the passenger compartment 2 are reduced, whereby increased safety is ensured for the driver and for the front passenger with respect to solutions without device 28.

Moreover, device 28 is extremely simple because it has a relatively small number of components and requires small modifications to be installed on the frames of the motor vehicles already known. In particular, there is a need to simply make hole 45 in the intermediate portion 34 of strut 7, fix the attachment portion 47 to face 52 when strut 7 is being made, and add plate 29 to upright 26 so as to define the attachment points of beam 32.

Finally, it is apparent from the above that modifications and variants may be made to the motor vehicle 1 herein described and illustrated, without departing from the scope of protection of the present invention, as defined in the appended claims.

In particular, end 35 of beam 32 may be connected to the annular structure 16 using different components than plate 29 described above; and/or the restraining member 46 could have different structure and/or shape than that provided by way of example; and/or tube 40 may be replaced by an elongated member having different cross section than the one shown in the accompanying figures.

The invention claimed is:

1. A motor vehicle comprising:
   a front engine compartment;
   a powertrain unit accommodated in said engine compartment;
   at least one longitudinal strut accommodated in said engine compartment, substantially parallel to an advancing longitudinal axis of the motor vehicle and comprising:
   a) an end portion which is longitudinally distanced from a passenger compartment of the motor vehicle; and
   b) an intermediate portion having a hole;
   a safety device coupled to said longitudinal strut and configured so as to move said powertrain unit sideways during an impact, towards the side opposite to the one concerned by said impact;
   characterized in that said safety device comprises:
   a beam elongated along an axis and having a first axial end fixed with respect to said end portion and spaced sideways from said terminal portion towards the outside of said engine compartment, and a second axial end fixed by means of fixing means to said intermediate portion in a position which is horizontally beside said powertrain unit; and
   a restraining member comprising:
   a) an attachment portion fixed to said intermediate portion; and
   b) a protruding portion, which protrudes with respect to said attachment portion so as to be arranged behind a wall of said beam, said protruding portion having a semi-spherical shape.

2. A motor vehicle according to claim 1, characterized in that said restraining member extends through said hole, and said intermediate portion is interposed between said second axial end and said attachment portion.

3. A motor vehicle according to claim 1, characterized in that said protruding portion and said beam are coaxial.

4. A motor vehicle according to claim 1, characterized in that said protruding portion is separate from said fixing means.

5. A motor vehicle according to claim 4, characterized in that said attachment portion is fixed to said intermediate portion by means of said fixing means.

6. A motor vehicle according to claim 5, characterized in that said attachment portion consists of a flange and of a plurality of nut screws fixed to said flange; said fixing means being defined by screws which are screwed into said nut screws so as to stably tighten said intermediate portion between said flange and said second axial end.

7. A motor vehicle according to claim 1, characterized in that said safety device comprises a substantially vertical plate to fix said first axial end to the end portion of said longitudinal strut.

8. A motor vehicle according to claim 1, characterized in that said axis is rectilinear.

9. A motor vehicle according to claim 1, characterized in that said beam comprises a tube, which extends from said first axial end to said second axial end and is engaged by said protruding portion.

* * * * *